United States Patent
Choi et al.

(10) Patent No.: US 9,946,121 B2
(45) Date of Patent: Apr. 17, 2018

(54) DISPLAY APPARATUS WITH IMPROVED COLOR SENSING AND METHOD OF MANUFACTURE

(71) Applicant: Samsung Display Co., Ltd., Yongin-si (KR)

(72) Inventors: Byungseok Choi, Yongin-si (KR); Junho Song, Yongin-si (KR); Junghun Noh, Yongin-si (KR); Keunkyu Song, Yongin-si (KR); Hyunsup Lee, Yongin-si (KR); Sanghee Jang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 15/226,477

(22) Filed: Aug. 2, 2016

(65) Prior Publication Data
US 2017/0153510 A1 Jun. 1, 2017

(30) Foreign Application Priority Data
Nov. 26, 2015 (KR) .................. 10-2015-0166406

(51) Int. Cl.
| | |
|---|---|
| G02F 1/1343 | (2006.01) |
| G02F 1/1335 | (2006.01) |
| G02F 1/1339 | (2006.01) |
| G02F 1/133 | (2006.01) |
| G02F 1/1333 | (2006.01) |
| G02F 1/1337 | (2006.01) |

(52) U.S. Cl.
CPC .... *G02F 1/134309* (2013.01); *G02F 1/13394* (2013.01); *G02F 1/133371* (2013.01);
(Continued)

(58) Field of Classification Search
CPC .......... G02F 1/134309; G02F 1/13394; G02F 1/133514; G02F 1/133371;
(Continued)

(56) References Cited

U.S. PATENT DOCUMENTS

| | | |
|---|---|---|
| 2006/0208293 A1 | 9/2006 | Lim et al. |
| 2010/0066952 A1 | 3/2010 | Tsuchiya et al. |

(Continued)

FOREIGN PATENT DOCUMENTS

| | | |
|---|---|---|
| JP | 2010-066643 | 3/2010 |
| KR | 10-2006-0034399 | 4/2006 |

(Continued)

*Primary Examiner* — Tracie Y Green
(74) *Attorney, Agent, or Firm* — H.C. Park & Associates, PLC

(57) ABSTRACT

A display apparatus includes: a first substrate including a first sub-pixel region, a second sub-pixel region, and a white sub-pixel region; a first color filter disposed on the first substrate in the first sub-pixel region; a second color filter disposed on the first substrate in the second sub-pixel region; an organic layer disposed on the first substrate, the organic layer covering the first color filter, the second color filter, and the white sub-pixel region; a second substrate facing the first substrate; a liquid crystal layer disposed between the first substrate and the second substrate; and a compensation pattern disposed between the first substrate and the second substrate, the compensation pattern being further disposed in the white sub-pixel region. A height of the liquid crystal layer corresponding to the white sub-pixel region is smaller than heights of the liquid crystal layer corresponding to the first sub-pixel region and the second sub-pixel region.

12 Claims, 10 Drawing Sheets

(52) U.S. Cl.
CPC .. *G02F 1/133512* (2013.01); *G02F 1/133514* (2013.01); *G02F 1/133516* (2013.01); *G02F 1/1337* (2013.01); *G02F 1/13306* (2013.01); *G02F 1/133345* (2013.01); *G02F 1/133528* (2013.01); *G02F 2001/13398* (2013.01); *G02F 2001/134345* (2013.01); *G02F 2201/123* (2013.01); *G02F 2203/01* (2013.01); *G02F 2203/04* (2013.01)

(58) Field of Classification Search
CPC ......... G02F 1/133512; G02F 1/133516; G02F 1/133345; G02F 1/13306; G02F 1/1337; G02F 2203/04; G02F 2001/13398; G02F 2001/134345
See application file for complete search history.

(56) References Cited

U.S. PATENT DOCUMENTS

| | | |
|---|---|---|
| 2012/0113347 A1 | 5/2012 | Shim |
| 2013/0314652 A1 | 11/2013 | Ryu et al. |
| 2014/0045102 A1 | 2/2014 | Jang et al. |

FOREIGN PATENT DOCUMENTS

| | | |
|---|---|---|
| KR | 10-2006-0101084 | 9/2006 |
| KR | 10-2013-0006560 | 1/2013 |
| KR | 10-2015-0018144 | 2/2015 |

DISPLAY APPARATUS WITH IMPROVED COLOR SENSING AND METHOD OF MANUFACTURE

CROSS-REFERENCE TO RELATED APPLICATION

This application claims priority from and the benefit of Korean Patent Application No. 10-2015-0166406, filed on Nov. 26, 2015, which is hereby incorporated by reference for all purposes as if fully set forth herein.

BACKGROUND

Field

Exemplary embodiments relate to a display apparatus and a method of manufacturing the same, and, more particularly, to a display apparatus configured to improve the color sense of an image and a method of manufacturing the same.

Discussion of the Background

With the development of various electronic devices, such as mobile phones, personal digital assistants, computers, widescreen televisions, and the like, has come a demand for the incorporation of flat panel displays in (or with) the various electronic devices. Among flat panel displays, a liquid crystal display (LCD) has many advantages, such as relatively low power consumption, relatively high contrast ratio, and the like. An LCD typically includes a liquid crystal layer disposed between substrates. An electric field may be applied to the liquid crystal layer to change an arrangement direction of liquid crystal molecules of the liquid crystal layer that, in turn, changes the polarization of incident light. The liquid crystal layer may be associated with a polarizer to control penetration of the incident light at each pixel to facilitate the display of an image. The luminance of an image displayed via a conventional LCD may not be sufficiently high, and, as such, the pixels of a conventional LCD may further include a white sub-pixel region to enhance the luminance. Inclusion of the white sub-pixels, however, may cause, at least in part, the quality of the image to deteriorate. For example, the brightness of yellow included in a white background may be relatively low.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a liquid crystal display apparatus configured to improve a color sense of an image.

One or more exemplary embodiments provide a method of manufacturing a liquid is crystal display apparatus configured to improve a color sense of an image.

Additional aspects will be set forth in the detailed description which follows, and, in part, will be apparent from the disclosure, or may be learned by practice of the inventive concept.

According to one or more exemplary embodiments, a display apparatus includes: a first substrate including a first sub-pixel region, a second sub-pixel region, and a white sub-pixel region; a first color filter disposed on the first substrate in the first sub-pixel region; a second color filter disposed on the first substrate in the second sub-pixel region; an organic layer disposed on the first substrate, the organic layer covering the first color filter, the second color filter, and the white sub-pixel region; a second substrate facing the first substrate; a liquid crystal layer disposed between the first substrate and the second substrate; and a compensation pattern disposed between the first substrate and the second substrate, the compensation pattern being further disposed in the white sub-pixel region. A height of the liquid crystal layer corresponding to the white sub-pixel region is smaller than heights of the liquid crystal layer corresponding to the first sub-pixel region and the second sub-pixel region.

According to one or more exemplary embodiments, a method of manufacturing a display apparatus includes: forming a first color filter on a first substrate in a first sub-pixel region; forming a second color filter on the first substrate in a second sub-pixel region; forming an organic layer on the first substrate, the organic layer overlapping the first color filter, the second color filter, and a white sub-pixel region of the first substrate; forming a spacer and a compensation pattern on the organic layer or on a second substrate, the compensation pattern being disposed in association with the white sub-pixel region and the spacer being spaced apart from the white sub-pixel region; coupling the first substrate and the second substrate together, is the spacer being configured to maintain spacing between the first substrate and the second substrate; and disposing liquid crystal between the first substrate and the second substrate.

According to one or more exemplary embodiments, a display apparatus includes: a substrate associated with a first sub-pixel region and a white sub-pixel region, a color of the first sub-pixel region being different than the white sub-pixel region; a compensation pattern disposed on the substrate, the compensation pattern being disposed in the white sub-pixel region and outside of the first sub-pixel region; and a layer disposed on the substrate, the layer comprising a controllable material configured to manipulate polarization of incident illumination. A first height of a first portion of the layer associated with the first sub-pixel region is greater than a second height of a second portion of the layer associated with the white sub-pixel region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
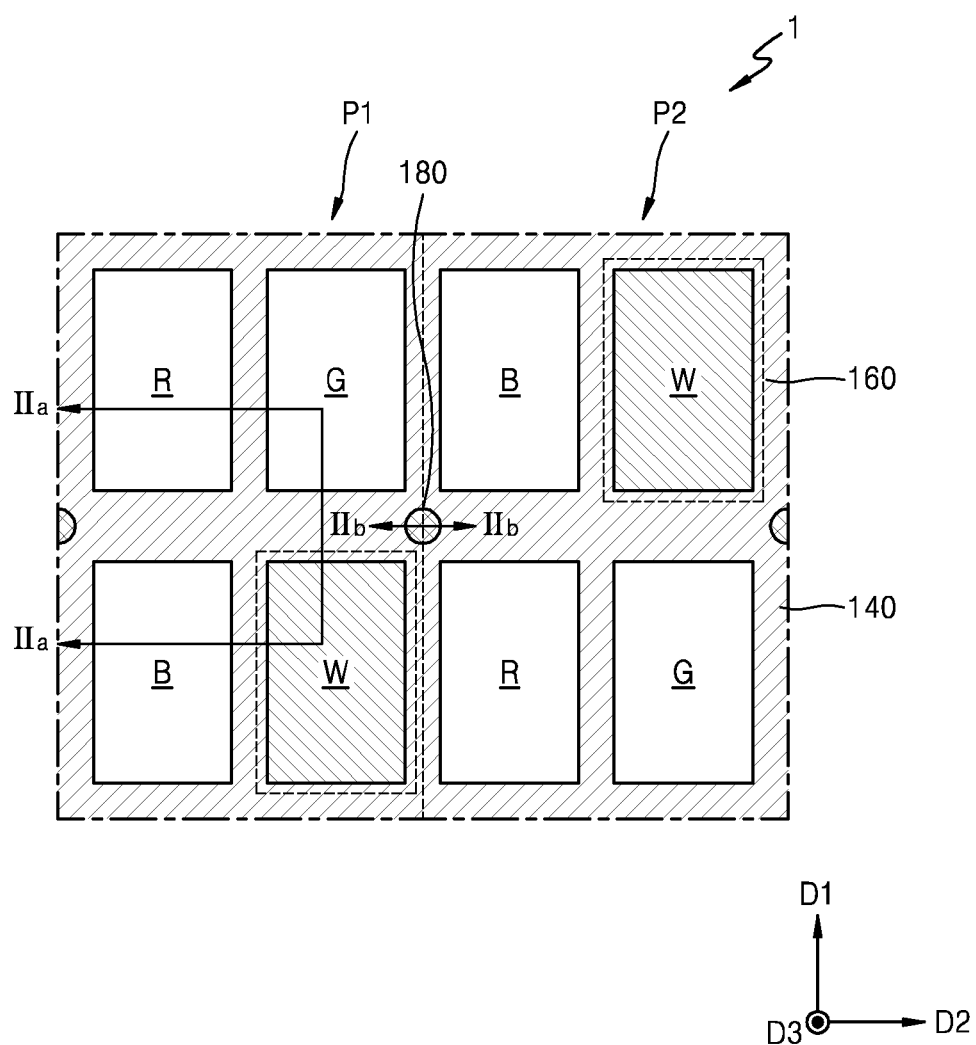
FIG. 1 is a plan view of a liquid crystal display apparatus, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an is exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the D1-axis, the D2-axis, and the D3-axis are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular ed herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although various exemplary embodiments are described with respect to liquid crystal display devices, it is contemplated that various exemplary embodiments are also applicable to other flat panel display devices including controllable layers, such as, for example, plasma displays, electrowetting displays, electrophoretic displays, etc.

Figure 2:
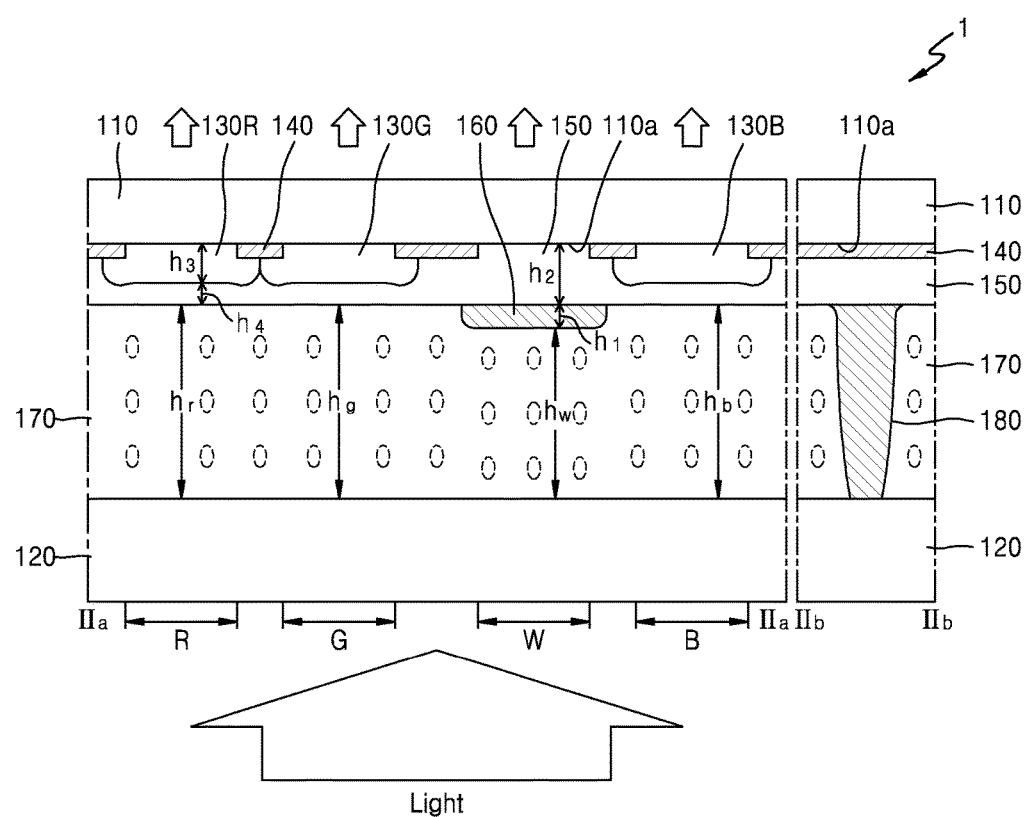
FIG. 2 is a cross-sectional view of the liquid crystal display apparatus of FIG. 1 taken along sectional line $II_a$-$II_a$ and sectional line $II_b$-$II_b$, according to one or more exemplary embodiments.

FIG. 1 is a plan view of a liquid crystal display apparatus, according to one or more exemplary embodiments. FIG. 2 is a cross-sectional view of the liquid crystal display apparatus of FIG. 1 taken along sectional line $II_a$-$II_a$ and sectional line $II_b$-$II_b$, according to one or is more exemplary embodiments.

Referring to FIGS. 1 and 2, a liquid crystal display (LCD) apparatus 1 includes: a first substrate 110 including a first sub-pixel region R, a second sub-pixel region G, and a white sub-pixel region W; a first color filter 130R and a second color filter 130G respectively provided in the first sub-pixel region R and the second sub-pixel region G over a first surface 110a of the first substrate 110; an organic layer 150 covering the first color filter 130R and the second color filter 130G over the first sub-pixel region R, the second sub-pixel region G, and the white sub-pixel region W of the first substrate 110; a second substrate 120 facing the first substrate 110; a liquid crystal layer 170 disposed between the first substrate 110 and the second substrate 120; and a compensation pattern 160 disposed on a region of the organic layer 150 corresponding to the white sub-pixel region W. A height $h_w$ of the liquid crystal layer 170 corresponding to the white sub-pixel region W is smaller than heights $h_r$ and $h_g$ of the liquid crystal layer 170 corresponding to the first sub-pixel region R and the second sub-pixel region G. It is noted that heights $h_r$, $h_g$, and $h_w$ are measured with respect to a direction perpendicular (or substantially perpendicular) to the first surface 110a of the first substrate 110.

According to one or more exemplary embodiments, the first substrate 110 may further include a third sub-pixel region B and a third color filter 130B provided in the third sub-pixel region B over the first surface 110a of the first substrate 110. The third color filter 130B may be covered by the organic layer 150 similar to how the first color filter 130R and the second color filter 130G are covered by the organic layer 150. According to one or more exemplary embodiments, the first color filter 130R, the second color filter 130G, and the third color filter B may respectively correspond to a red color filter, a green color filter, and a blue color filter configured to convert incident light respectively into red light, green light, and blue light. It is contemplated, however, that any suitable color may be utilized in association with exemplary embodiments described herein.

According to one or more exemplary embodiments, the LCD apparatus 1 includes a plurality of pixels, each of the plurality of pixels may include the first sub-pixel region R including a first sub-pixel emitting red light, the second sub-pixel region G including a second sub-pixel emitting green light, the third sub-pixel region B including a third sub-pixel emitting blue light, and the white sub-pixel region W including a white sub-pixel transmitting incident light without color conversion. The first through third sub-pixel regions R, G, and B and the white sub-pixel region W may be defined by wires (not shown) extending in a first (e.g., column) direction, such as data lines, and a second (e.g., row) direction, such as gate lines. The wires may be covered by a light shielding member 140, such as a black matrix.

As seen in FIG. 1, a first pixel P1 and a second pixel P2 may be adjacent to each other in the second direction. The first and second pixels P1 and P2 may each include the first sub-pixel region R, the second sub-pixel region G, the third sub-pixel region B, and the white sub-pixel region W that are provided in a 2×2 matrix formation. The first sub-pixel region R, the second sub-pixel region G, the third sub-pixel region B, and the white sub-pixel region W in the first pixel P1 may be provided on columns and/or rows respectively different from the first sub-pixel region R, the second sub-pixel region G, the third sub-pixel region B, and the white sub-pixel region W in the second pixel P2. Such an arrangement of the first and second pixels P1 and P2 may prevent the generation of a spot in a display image of the LCD apparatus 1, and, as such, the quality of the display image may be enhanced. It is noted, however, that the arrangement of the first sub-pixel region R, the second sub-pixel region G, the third sub-pixel region B, and the white sub-pixel region W of FIG. 1 is merely illustrative. In other words, is exemplary embodiments are not limited thereto. For instance, the first sub-pixel region R, the second sub-pixel region G, the third sub-pixel region B, and the white sub-pixel region W may be arranged in any one of various formations, such as a stripe formation, etc.

According to one or more exemplary embodiments, the first substrate 110 may be an upper substrate provided in a third direction D3 in which an image is displayed based on the positioning of the liquid crystal layer 170. The second substrate 120 may face the first substrate 110 and may be a lower substrate. Although not illustrated, the LCD apparatus 1 may include a driving circuit (not shown) for driving each of the first sub-pixel, the second sub-pixel, and the third sub-pixel in the first sub-pixel region R, the second sub-pixel region G, and the third sub-pixel region B, as well as the white sub-pixel in the white sub-pixel region W. The LCD apparatus 1 may also include wires (not shown) for applying a signal to the driving circuit, and a pixel electrode (not shown) electrically connected to the driving circuit. The pixel electrode may be disposed above the second substrate 120. The pixel electrode may be formed in corresponding with each of the sub-pixels. The LCD apparatus 1 may also include a common electrode (not shown) for applying an electric field to the liquid crystal layer 170 together with the pixel electrode, and an alignment layer (not shown) to provide an alignment direction of a liquid crystal material included in the liquid crystal layer 170 when the electric field is not applied to the liquid crystal layer 170. The common electrode and the alignment layer may be provided above and/or below the liquid crystal layer 170. It is noted, however, that the arrangement of the electrodes and an orientation direction of an alignment layer may vary depending on a mode of the LCD apparatus 1.

Although not illustrated, the LCD apparatus 1 may include a first polarizer (not shown) and a second polarizer (not shown) respectively provided outside or inside the first and is second substrates 110 and 120. A backlight unit (not shown) may be provided for irradiating light to the second substrate 120.

The first color filter 130R, the second color filter 130G, and the third color filter 130B are disposed on the first substrate 110, and the light shielding member 140 for preventing color mixture between the first sub-pixel region R, the second sub-pixel region G, and the third sub-pixel region B may be disposed between each of the first color filter 130R, the second color filter 130G, and the third color filter 130B. Since incident light penetrates through the white sub-pixel region W, a filter converting a color of incident light may not be disposed in the white sub-pixel region W.

According to one or more exemplary embodiments, the LCD apparatus 1 includes a spacer 180 for maintaining an interval (or spacing) between the first substrate 110 and the second substrate 120 facing the first substrate 110. The spacer 180 may be provided at a location where the light shielding member 140 is disposed between the first sub-pixel region R, the second sub-pixel region G, the third sub-pixel region B, and the white sub-pixel region W.

The organic layer 150 covering the first color filter 130R, the second color filter 130G, and the third color filter 130B may be disposed on the first substrate 110. The organic layer 150 may be configured to remove stepped portions formed by the first color filter 130R, the second color filter 130G, and the third color filter 130B, and may extend not only to the first color filter 130R, the second color filter 130G, and the third color filter 130B of the first substrate 110, but also to the white sub-pixel region W. The organic layer 150 may be formed of a material having relatively high light transmissivity. A top surface of the first substrate 110 may be flattened (or planarized) by the organic layer 150 formed of an organic material.

The white sub-pixel region W may be a region transmitting incident light received is from the backlight unit or the like, and may increase luminance of light emitted from the LCD apparatus 1 to display an image. However, when luminance of white light is increased by the white sub-pixel region W, a color sense of an image displayed via the LCD apparatus 1 may become different from an intended color sense. For instance, when a yellow image is realized on a white background, the brightness of yellow may be decreased and yellow may look ocher. The LCD apparatus 1, according to one or more exemplary embodiments, may include the compensation pattern 160 disposed on the region of the organic layer 150 corresponding to the white sub-pixel region W. The compensation pattern 160 may be patterned to be only in the white sub-pixel region W and not in the first, second, and third sub-pixel regions R, G, and B.

The spacer 180 for maintaining the interval between the first substrate 110 and the second substrate 120 may be provided in a region from among regions between the first sub-pixel region R, the second sub-pixel region G, the third sub-pixel region B, and the white sub-pixel region W. As such, the light shielding member 140, the organic layer 150, and the spacer 180 may be sequentially disposed in the one region above the first substrate 110. According to one or more exemplary embodiments, the compensation pattern 160 may be formed of the same material as the spacer 180, and the compensation pattern 160 and the spacer 180 may be formed of a material different from the organic layer 150.

The organic layer 150 is used mainly for planarization, and may be formed of an organic material that has relatively high flatness, but may be relatively difficult to pattern. It is noted, however, that since the spacer 180 may be formed via a patterning process, the spacer 180 may be formed of a photosensitive organic material that may be easily patterned. The spacer 180 may also be formed of a material having sufficient elasticity to maintain the interval between the first substrate 110 and the second substrate 120 that may be flexed with respect to an external pressure. In one or more exemplary embodiments, the compensation pattern 160 and the spacer 180 may be simultaneously formed using one mask, and, as such, may be formed of the same material as one another. According to one or more exemplary embodiments, a height of the spacer 180 may be substantially the same as a height of the liquid crystal layer 170 in a region where the spacer 180 is provided, and may be equal to or greater than about 3 μm. A height $h_1$ of the compensation pattern 160 may be less than about 1 μm. In this manner, the ratio of the height $h_1$ of the compensation pattern 160 and the height of the spacer 180 (or the height of the liquid crystal layer 170) may be more than 3. The height $h_1$ of the compensation pattern 160 may be determined by considering luminance of light emitted from the white sub-pixel region W and a change degree of a color sense within such a range. The height $h_w$ of the liquid crystal layer 170 corresponding to the white sub-pixel region W may be smaller than the heights $h_r$, $h_g$, and $h_b$ of the liquid crystal layer 170 corresponding to the first sub-pixel region R, second sub-pixel region G, and the third sub-pixel region B with respect to a direction substantially perpendicular to the first surface 110a of the first substrate 110 because of the height $h_1$ of the compensation pattern 160.

According to one or more exemplary embodiments, the heights $h_r$, $h_g$, and $h_b$ of the liquid crystal layer 170 may be from about 2.7 μm to about 3.7 μm, and the height $h_w$ of the liquid crystal layer 170 may be less than the heights $h_r$, $h_g$, and $h_b$. Characteristics of light penetrating through the liquid crystal layer 170 may vary depending on the alignment direction of the liquid crystal material included in the liquid crystal layer 170 and a length of a path penetrating through the liquid crystal material. The heights $h_r$, $h_g$, and $h_b$ of the liquid crystal layer 170 may be pre-set by considering a color sense and luminance of a desired image, and when a height of the liquid crystal layer 170 is different from a set height, a color sense of an is image may become different. According to one or more exemplary embodiments, the heights $h_r$, $h_g$, and $h_b$ of the liquid crystal layer 170 may be the same (or substantially the same) as one another. Further, a sum of the height $h_1$ of the compensation pattern 160 corresponding to the white sub-pixel region W and a height $h_2$ of the organic layer 150 may be greater than a sum of a height $h_3$ of the first color filter 130R and a height $h_4$ of the organic layer 150 corresponding to the first sub-pixel region R. The heights $h_1$ through $h_4$ may be determined based on flat (or substantially flat) top surfaces of the compensation pattern 160, the organic layer 150, and the first color filter 130R, and, as such, an edge region and a region curved by a stepped portion may have a height different from the heights $h_1$ through $h_4$.

By disposing the compensation pattern 160 in the white sub-pixel region W, the height $h_w$ of the liquid crystal layer 170 corresponding to the white sub-pixel region W may be smaller than the heights $h_r$, $h_g$, and $h_b$ of the first sub-pixel region R, the second sub-pixel region G, and the third sub-pixel region B, and, in this manner, white light emitted through the white sub-pixel region W may be bluish. Also, the compensation pattern 160 is formed of a material having relatively high light transmissivity, but since the light transmissivity may not be 100%, the compensation pattern 160 may have light absorptance. As such, luminance of the white light emitted through the white sub-pixel region W may be decreased by the compensation pattern 160. A bluish white light may be mixed with yellow having relatively low brightness to increase a color sense of yellow, and the decreased luminance of the white light may also compensate for decreased brightness of yellow in a white background. In other words, use of the compensation pattern 160 may enable a color sense of an image displayed via the LCD apparatus 1 to be the same as an intended color sense. That is, a phenomenon causing, at least in part, the brightness of yellow to be decreased and yellow appearing ocher when a yellow image is displayed on a is white background may be prevented (or reduced).

According to one or more exemplary embodiments, the first color filter 130R, the second color filter 130G, and the third color filter 130B included in the LCD apparatus 1 may respectively correspond to a red color filter, a green color filter, and a blue color filter, but exemplary embodiments are not limited thereto. A combination of colors other than red, green, and blue may be used as long as white light is displayed by combining lights emitted from the first, second, and third sub-pixel regions R, G, and B and the white sub-pixel region W.

FIGS. 3A, 3B, 3C, 3D, 3E, and 3F are cross-sectional of a liquid crystal display apparatus at various stages of manufacture, according to one or more exemplary embodiments.

Figure 3A:
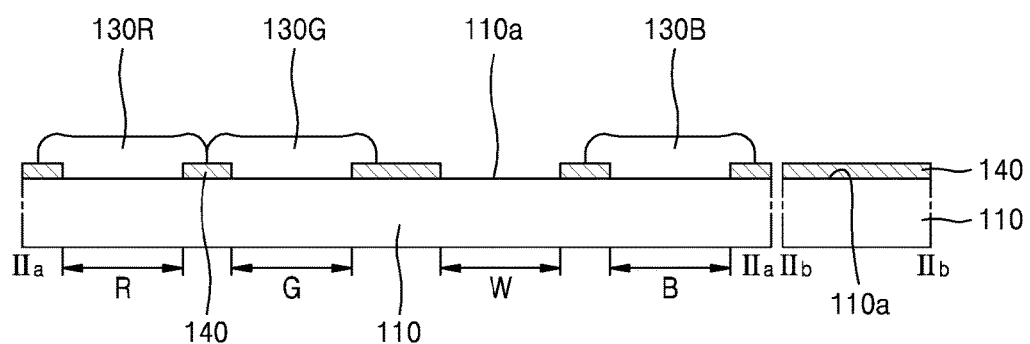
FIGS. 3A, 3B, 3C, 3D, 3E, and 3F are cross-sectional of a liquid crystal display apparatus at various stages of manufacture, according to one or more exemplary embodiments.

Referring to FIG. 3A, the first substrate 110 including the first sub-pixel region R, the second sub-pixel region G, the third sub-pixel region B, and the white sub-pixel region W is prepared, and the first color filter 130R, the second color filter 130G, and the third color filter 130B are formed respectively in the first sub-pixel region R, the second sub-pixel region G, and the third sub-pixel region B on the first surface 110a of the first substrate 110.

The first color filter 130R, the second color filter 130G, and the third color filter 130B may respectively be a red color filter, a green color filter, and a blue color filter converting incident light respectively to red light, green light, and blue light, and may be formed of one or more organic materials including different colors of figments and/or dyes. The first color filter 130R, the second color filter 130G, and the third color filter 130B may be sequentially formed, and an order of forming the first color filter 130R, the second color filter 130G, and the third color filter 130B is not limited to any particular order. Before or after forming the first color filter 130R, the second color filter 130G, and the third color filter 130B, the light shielding member 140 for preventing color mixture between the first sub-pixel region R, the second sub-pixel region G, and the third sub-pixel region B may be further formed, and the light shielding member 140 may also be formed in a region where a spacer 180 is to be formed.

Figure 3B:
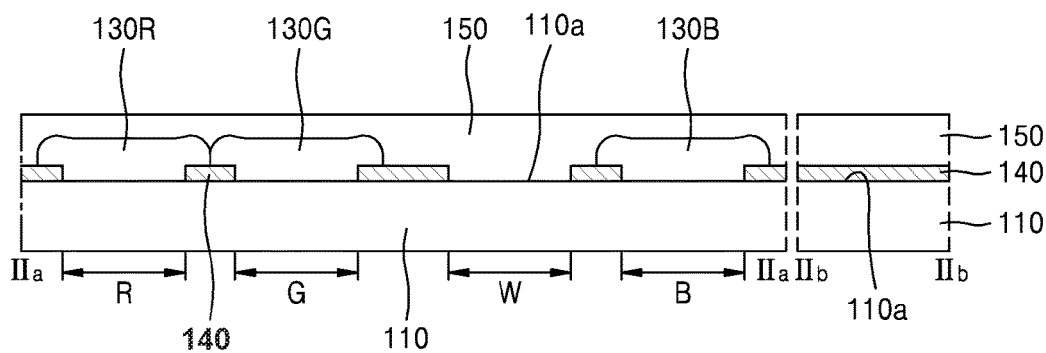

Referring to FIG. 3B, the organic layer 150 may be formed to cover the first color filter 130R, the second color filter 130G, and the third color filter 130B above the first sub-pixel region R, the second sub-pixel region G, and the third sub-pixel region B, as well as formed to cover the white sub-pixel region W of the first substrate 110. The organic layer 150 removes a stepped portion formed by the first color filter 130R, the second color filter 130G, and the third color filter 130B, and may extend not only to the first sub-pixel region R, the second sub-pixel region 130G, and the third sub-pixel region B, but also to the white sub-pixel region W. The organic layer 150 is formed of a material having relatively high light transmissivity. The top (or upper) surface of the first substrate 110 may be flattened (or planarized) by the organic layer 150 formed of an organic material.

Figure 3C:
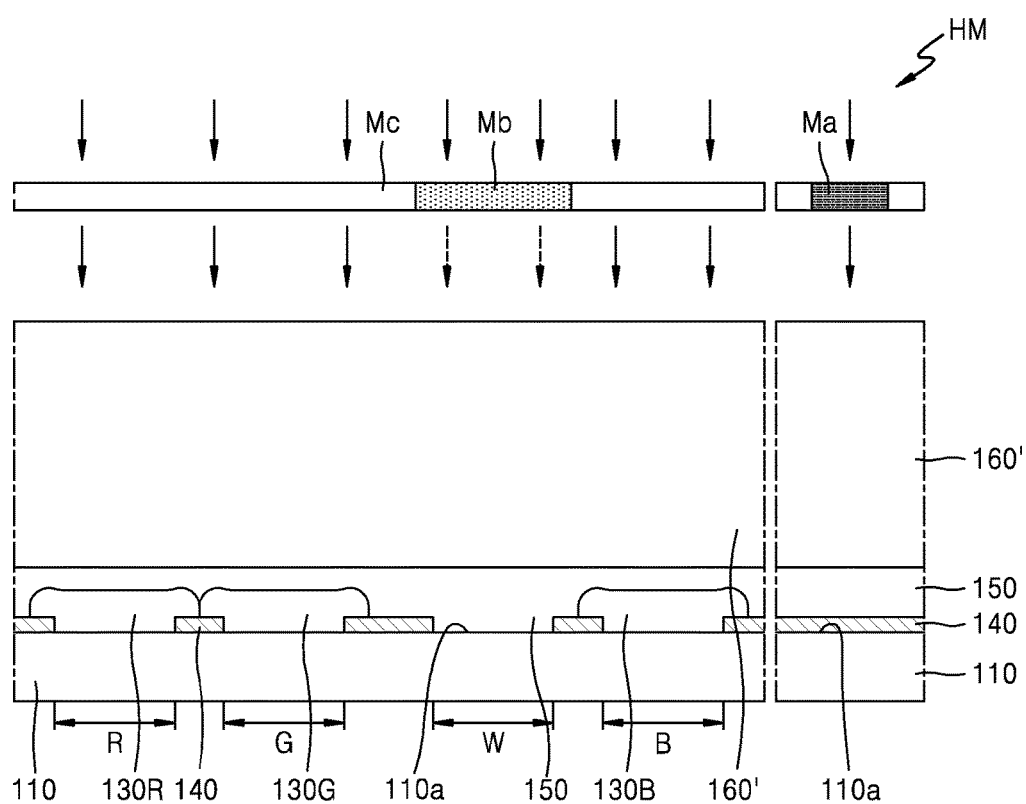
Figure 3D:
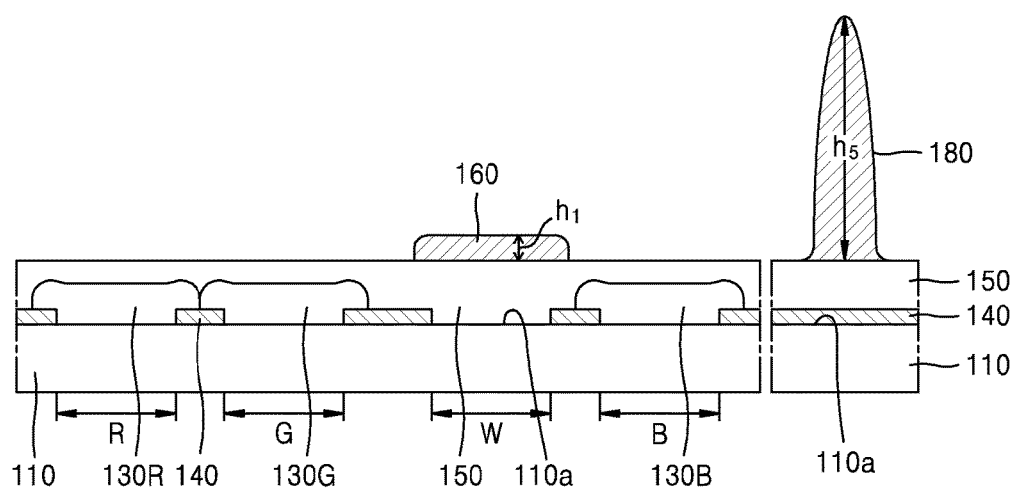

Referring to FIGS. 3C and 3D, a photosensitive organic material 160' is formed on the organic layer 150, and light may be radiated on the photosensitive organic material 160' using a halftone mask HM including a light shielding portion Ma blocking light, a semi-transmitting portion Mb transmitting a portion of the light, and a transmitting portion Mc transmitting light. The photosensitive organic material 160' may be different from a material forming the organic layer 150. In one or more exemplary embodiments, the photosensitive organic material 160' may be a positive photosensitive organic material in which a region radiated by light is dissolved in a developing solution, and the light shielding portion Ma may correspond to a region where the spacer 180 is formed and the semi-transmitting portion Mb may correspond to a region where the compensation pattern 160 is formed.

After radiating light using the halftone mask HM, a portion of the photosensitive is organic material 160' is removed using a developing solution, thereby forming the compensation pattern 160 having the height $h_1$ and the spacer 180 having the height $h_s$ greater than the height $h_1$. In other words, the photosensitive organic material 160' corresponding to the light shielding portion Ma of the halftone mask HM is not removed, and, as such, the spacer 180 having the height $h_s$ that is the same (or substantially the same) as a height of the photosensitive organic material 160' formed on the organic layer 150 may be formed in a region corresponding to the light shielding portion Ma. The photosensitive organic material 160' corresponding to the semi-transmitting portion Mb of the halftone mask MH is only partially removed according to an amount of radiated light, and, as such, the compensation pattern 160 having the height $h_1$ smaller than the height $h_s$ may be formed in a region corresponding to the semi-transmitting portion Mb. The remaining regions of the photosensitive organic material 160' may be completely removed. In other words, the spacer 180 and the compensation pattern 160 may be simultaneously formed using one mask, and, in this manner, a mask or a process for forming the compensation pattern 160 is not separately required, but may be utilized. When one mask is used, however, the compensation pattern 160 may be formed without increasing manufacturing time and costs.

The height $h_1$ may be less than or equal to about 1 μm, and the height $h_s$ may be greater than or equal to about 3 μm, but the height $h_s$ may be somewhat greater than a height of the spacer 180 corresponding to a cell gap of FIG. 2.

Figure 3E:
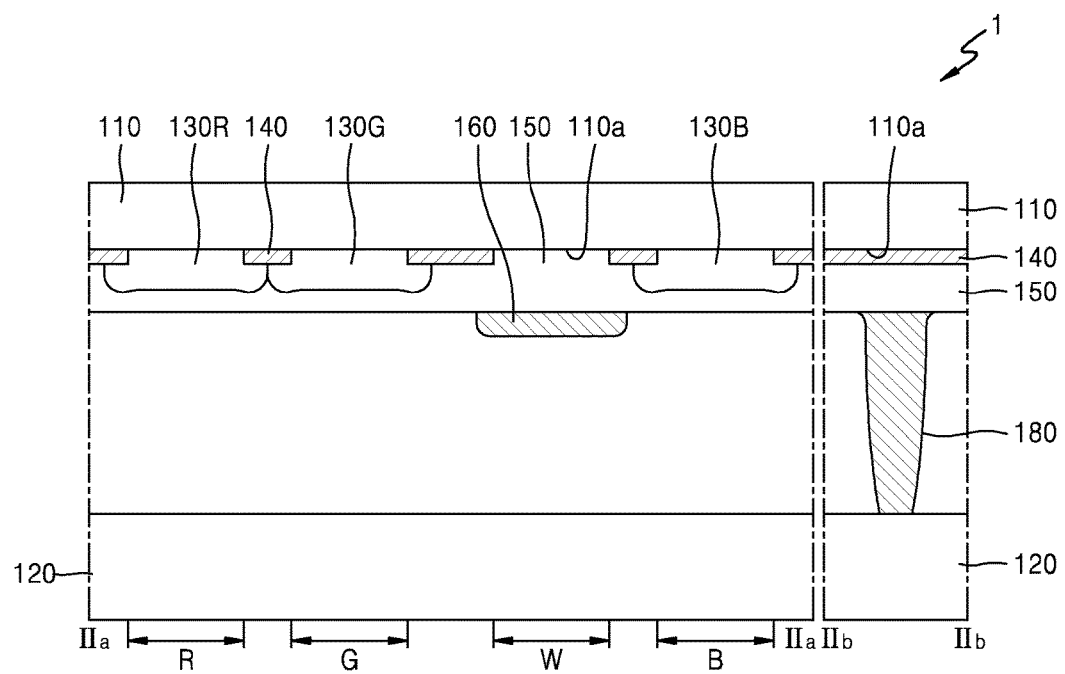

Referring to FIG. 3E, the first substrate 110 and second substrate 120 are disposed such that the spacer 180, the organic layer 150, and the compensation pattern 160 are disposed therebetween. The first and second substrates 110 and 120 may be bonded together using a sealing member (not shown). Although not illustrated, before bonding the first and second substrates 110 and 120, the driving circuit, the wires, and the pixel electrode may be formed is above the second substrate 120. The spacer 180 formed above the first substrate 110 maintains an interval between the first and second substrates 110 and 120, and an upper portion of the spacer 180 is pressed by the second substrate 120 during a bonding process, such that a height of the spacer 180 may become smaller than the height $h_s$.

Figure 3F:
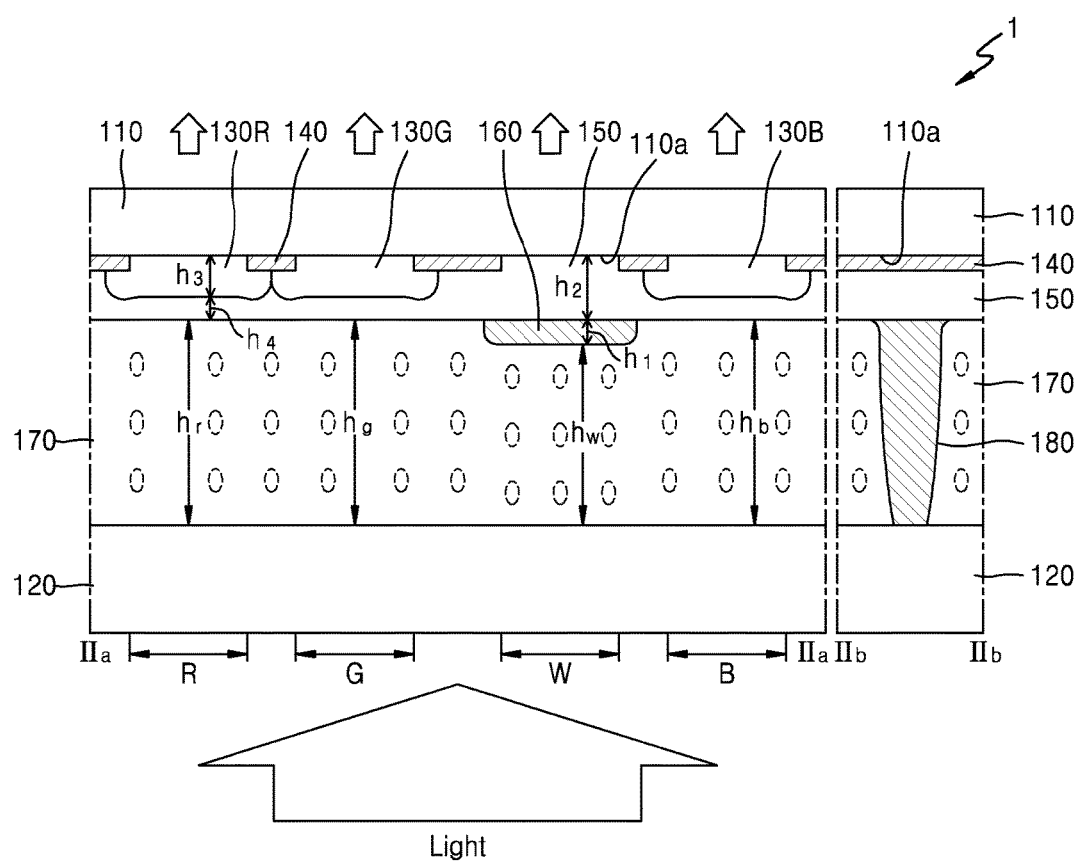

Referring to FIG. 3F, the liquid crystal layer 170 is formed by injecting liquid crystal between the first and second substrates 110 and 120. Although not illustrated, a region into which the liquid crystal is injected is sealed.

Figure 4:
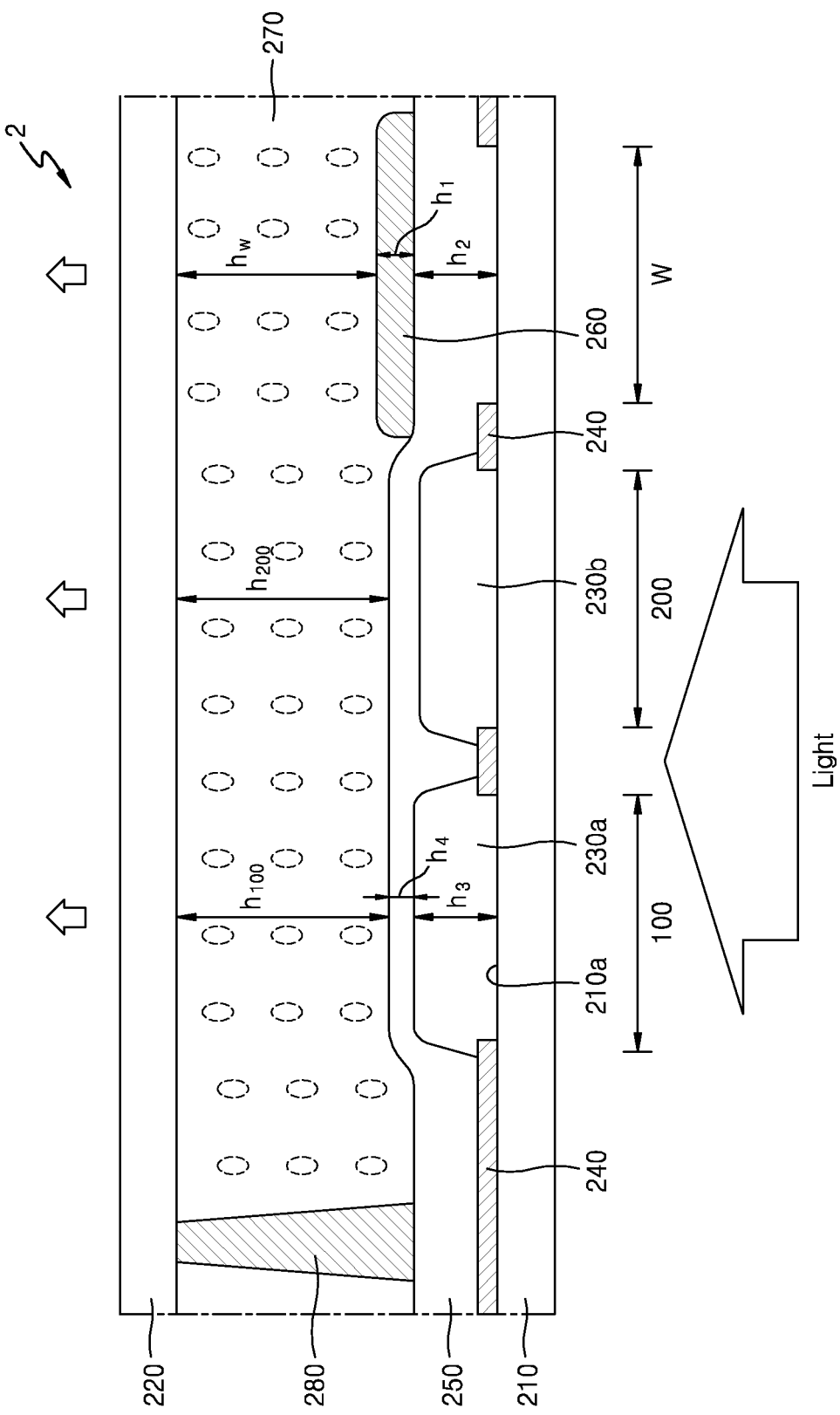
FIG. 4 is a cross-sectional view of a liquid crystal display apparatus, according to one or more exemplary embodiments.

FIG. 4 is a cross-sectional view of a liquid crystal display apparatus, according to one or more exemplary embodiments.

Referring to FIG. 4, the LCD apparatus 2 includes: a first substrate 210 including a first sub-pixel region 100, a second sub-pixel region 200, and a white sub-pixel region W; a first color filter 230a and a second color filter 230b respectively disposed in the first sub-pixel region 100 and the second sub-pixel region 200 on a first surface 210a of the first substrate 210; an organic layer 250 provided to cover the first color filter 230a and the second color filter 230b over the first sub-pixel region 100, the second sub-pixel region 200, and the white sub-pixel region W of the first substrate 210; a second substrate 220 facing the first substrate 210; a liquid crystal layer 270 disposed between the first substrate 210 and the second substrate 220; and a compensation pattern 260 disposed on the region of the organic layer 150 corresponding to the white sub-pixel region W. The height $h_w$ of the liquid crystal layer 270 corresponding to the white sub-pixel region W is smaller than heights $h_{100}$ and $h_{200}$ of the liquid crystal layer 270 corresponding to the first sub-pixel region 100 and the second sub-pixel region 200, with respect to a direction perpendicular (or substantially perpendicular) to the first surface 210a of the first substrate 210.

According to one or more exemplary embodiments, the first substrate 210 may be a lower substrate provided in a direction opposite to where an image is displayed based on the positioning of the liquid crystal layer 270. Although not illustrated, a driving circuit for driving each of a first sub-pixel in the first sub-pixel region 100 and a second sub-pixel in the second sub-pixel region 200 and a white sub-pixel in the white sub-pixel region W, wires for applying a signal to the driving circuit, and a pixel electrode may be provided on the first substrate 210.

The first color filter 230a and the second color filter 230b may respectively be a red color filter and a green color filter converting incident light respectively to red light and green light, but are not limited thereto. The first color filter 230a and the second color filter 230b are provided above the first substrate 210, and a light shielding layer 240 for preventing a color mixture between the first sub-pixel region 100, the second sub-pixel region 200, and the white sub-pixel region W may be provided between the first color filter 230a and the second color filter 230b and between components adjacent to the white sub-pixel region W. Since incident light penetrates through the white sub-pixel region W, a filter converting a color of incident light may not be disposed in the white sub-pixel region W.

The organic layer 250 covering the first color filter 230a and the second color filter 230b may be provided above the first substrate 210. The organic layer 250 protects the first color filter 230a and the second color filter 230b, and may extend not only to the first sub-pixel region 100 and the second sub-pixel region 200 of the first substrate 210, but also to the white sub-pixel region W. The organic layer 250 is formed of a material having relatively high light transmissivity, and may include a contact hole (not shown) for electrically connecting the driving circuit and the pixel electrode, wherein the organic layer 250 is disposed therebetween. As such, the organic layer 250 may be formed of an organic material capable of being patterned.

A stepped portion may be formed between the organic layer 250 disposed above the first color filter 230a and the second color filter 230b and the organic layer 250 disposed in the white sub-pixel region W where a color filter is not provided. Based on characteristics of an organic material capable of being patterned, a stepped portion between a region where the first color filter 230a and the second color filter 230b are formed and a region where color filters are not provided may not be completely flat.

The white sub-pixel region W is a region transmitting incident light received from a backlight unit (not shown) or the like, and may increase luminance of light emitted from the LCD apparatus 2 to display an image. However, when luminance of white light is increased by the white sub-pixel region W, a color sense of an image displayed via the LCD apparatus 2 may become different from an intended color sense. For instance, when a yellow image is realized on a white background, the brightness of yellow may be decreased and yellow may look ocher. The LCD apparatus 2, according to one or more exemplary embodiments, may include the compensation pattern 260 provided in the white sub-pixel region W above the organic layer 250 to eliminate (or at least reduce) the degradation in color sense. The compensation pattern 260 may be patterned to be disposed only in the white sub-pixel region W and not in the first sub-pixel region 100 and second sub-pixel region 200.

A spacer 280 for maintaining an interval between the first substrate 210 and the second substrate 220 may be provided. In this manner, the light shielding layer 240, the organic layer 250, and the spacer 280 may be sequentially disposed in a region above the first substrate 210. According to one or more exemplary embodiments, the compensation pattern 260 may be formed of the same material as the spacer 280, and the compensation pattern 260 and the spacer 280 may be formed of a material different from the organic layer 250.

According to one or more exemplary embodiments, a height of the spacer 280 may be substantially the same as a height of the liquid crystal layer 270 in a region where the spacer 280 is provided, and may be greater than or equal to about 3 μm, and the height $h_1$ of the compensation pattern 260 may be less than about 1 μm. As such, the ratio of the height $h_1$ of the compensation pattern 260 and the height of the spacer 280 (or the height of the liquid crystal layer 270) may be more than 3. The height $h_1$ of the compensation pattern 260 may be determined by considering luminance of light emitted from the white sub-pixel region W and a change degree of a color sense within such a range.

The height $h_w$ of the liquid crystal layer 270 corresponding to the white sub-pixel region W may be smaller than the heights $h_{100}$ and $h_{200}$ of the liquid crystal layer 270 corresponding to the first and second sub-pixel regions 100 and 200, with respect to a direction perpendicular (or substantially perpendicular) to the first surface 210a of the first substrate 210 because of the presence of the compensation pattern 260. The heights $h_{100}$ and $h_{200}$ of the liquid crystal layer 270 may be substantially the same in association with the first and second sub-pixel regions 100 and 200. In this manner, a sum of the height $h_1$ of the compensation pattern 260 corresponding to the white sub-pixel region W and the height $h_2$ of the organic layer 250 may be greater than a sum of the height $h_3$ of the first color filter 230a and the height $h_4$ of the organic layer 250 corresponding to the first sub-pixel region 100. The heights $h_1$ through $h_4$ may be determined based on substantially flat top surfaces of the compensation pattern 260, the organic layer 250, and the first color filter 230a, and, thus, an edge region and a region curved by a stepped portion of these components may have a height different from the heights $h_1$ through $h_4$.

By disposing the compensation pattern 260 in the white sub-pixel region W, the height $h_w$ of the liquid crystal layer 270 corresponding to the white sub-pixel region W may be is smaller than heights $h_{100}$ and $h_{200}$ associated with the first and second sub-pixel regions 100 and 200. Accordingly, white light emitted through the white sub-pixel region W may be bluish. It is also noted that the compensation pattern 260 is formed of a material having relatively high light transmissivity, but since the light transmissivity is not 100%, the compensation pattern 260 may have light absorptance. To this end, luminance of the white light emitted through the white sub-pixel region W may be decreased by the compensation pattern 260. A bluish white light may be mixed with yellow having relatively lower brightness to increase a color sense of yellow, and the decreased luminance of the white light may also compensate for decreased brightness of yellow in a white background. As such, by using the compensation pattern 260, a color sense of an image displayed via the LCD apparatus 2 may be the same as (or at least closer to) an intended color sense. Moreover, a phenomenon in which, when a yellow image is displayed on a white background, the brightness of yellow is decreased and yellow looks ocher may be prevented (or at least reduced).

Figure 5:
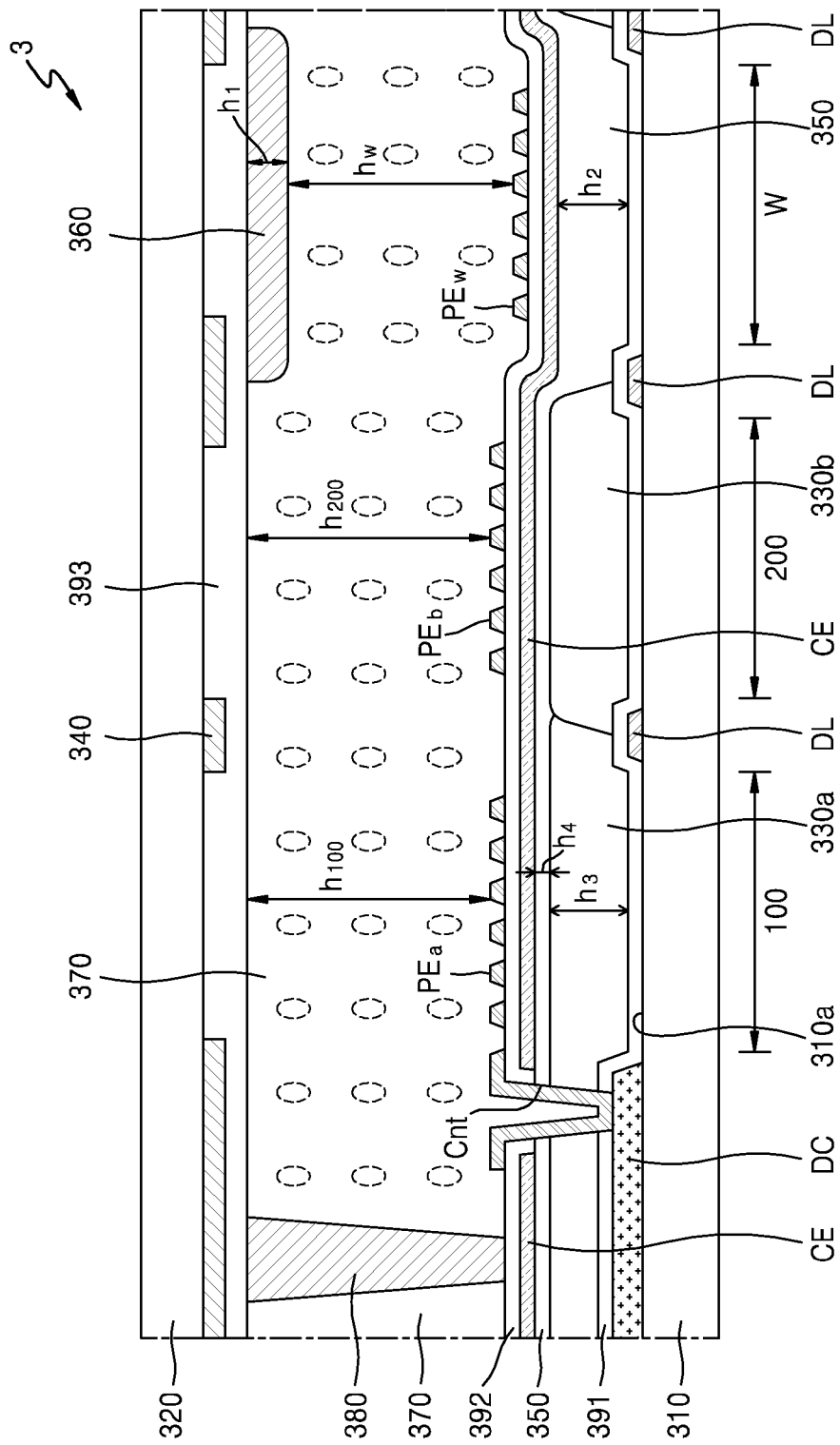
FIG. 5 is a cross-sectional view of a liquid crystal display apparatus, according to one or more exemplary embodiments.

FIG. 5 is a cross-sectional view of a liquid crystal display apparatus, according to one or more exemplary embodiments.

Referring to FIG. 5, the LCD apparatus 3 includes: a first substrate 310 including the first sub-pixel region 100, the second sub-pixel region 200, and a white sub-pixel region W; a first color filter 330a and a second color filter 330b respectively provided in the first sub-pixel region 100 and the second sub-pixel region 200 over a first surface 310a of the first substrate 310; an organic layer 350 provided to cover the first color filter 330a and the second color filter 330b over the first sub-pixel region 100, the second sub-pixel region 200, and the white sub-pixel region W of the first substrate 310; a second substrate 320 facing the first substrate 310; a liquid crystal layer 370 disposed between the first substrate 310 and the second substrate 320; is and a compensation pattern 360 disposed in the region of the organic layer 350 corresponding to the white sub-pixel region W. The height $h_w$ of the liquid crystal layer 370 corresponding to the white sub-pixel region W is smaller than the heights $h_{100}$ and $h_{200}$ of the liquid crystal layer 370 corresponding to the first sub-pixel region 100 and the second sub-pixel region 200, with respect to a direction perpendicular (or substantially perpendicular) to the first surface 310a of the first substrate 310.

According to one or more exemplary embodiments, the first substrate 310 may be a lower substrate provided in a direction opposite to where an image is displayed based on the position of the liquid crystal layer 370. A driving circuit DC for driving the first sub-pixel in the first sub-pixel region 100 and the second sub-pixel in the second sub-pixel region 200 and the white sub-pixel region W, a data line DL for applying a data signal to the driving circuit DC, and first pixel electrode Pea, second pixel electrode PEb, and third pixel electrodes PEw may be provided above the first substrate 310. Although not illustrated, wires other than the data line DA, such as a scan line and a power supply line, may be further provided above the first substrate 310.

A first insulating layer 391 covering the driving circuit DC and the data line DL are provided above the first substrate 310, and the first color filter 330a and the second color filter 330b may be provided respectively in the first sub-pixel region 100 and the second sub-pixel region 200 above the first insulating layer 391. Since incident light penetrates through the white sub-pixel region W, a filter converting a color of incident light may not be provided in the white sub-pixel region W.

The organic layer 350 covering the first color filter 330a and the second color filter 330b may be provided above the first substrate 310. The organic layer 350 protects the first is color filter 330a and the second color filter 330b, and may extend not only to the first sub-pixel region 100 and the second sub-pixel region 200 of the first substrate 310, but also to the white sub-pixel region W. The organic layer 350 is formed of a material having relatively high light transmissivity, and may include a contact hole Cnt for electrically connecting the driving circuit DC and the first pixel electrode PEa, wherein the organic layer 350 is disposed therebetween. As such, the organic layer 350 may be formed of an organic material capable of being patterned.

A stepped portion may be formed between the organic layer 350 disposed above the first color filter 330a and the second color filter 330b and the organic layer 350 disposed in the white sub-pixel region W where a color filter is not provided. Based on characteristics of an organic material capable of being patterned, a stepped portion between a region where the first color filter 330a and the second color filter 330b are formed and a region where a color filter is not provided may not be completely flat.

A common electrode CE and the first pixel electrode Pea, the second pixel electrode PEb, and the third pixel electrode PEw for applying an electric field to the liquid crystal layer 370 may be provided above the organic layer 350. The common electrode CE is commonly provided throughout the first sub-pixel region 100, the second sub-pixel region 200, and the white sub-pixel region W to commonly apply a voltage to the first sub-pixel region 100, the second sub-pixel region 200, and the white sub-pixel region W.

The first pixel electrode PEa, the second pixel electrode PEb, and the third pixel electrode PEw may respectively correspond to the first sub-pixel region 100, the second sub-pixel region 200, and the white sub-pixel region W, which may be electrically insulated from each other. As such, light having a desired color may be displayed in one pixel by controlling each voltage applied to the first, second, and third pixel electrodes PEa, PEb, and PEw. In FIG. 5, only the driving circuit DC connected to the first pixel electrode PEa is illustrated, but the LCD apparatus 3 may include driving circuits (not shown) connected to the second and third pixel electrodes PEb and Pew, respectively. It is also noted that a second insulating layer 392 may be provided between the common electrode CE and the first, second, and third pixel electrodes PEa, PEb, and PEw.

The white sub-pixel region W is a region transmitting incident light received from a backlight unit (not shown) or the like, and may increase luminance of light emitted from the LCD apparatus 3 to display an image. However, when luminance of white light is increased by the white sub-pixel region W, a color sense of an image displayed on the LCD apparatus 3 may become different from an intended color sense. For instance, when a yellow image is displayed on a white background, the brightness of yellow may be decreased and yellow may look ocher.

The LCD apparatus 3, according to one or more exemplary embodiments, may include the compensation pattern 360 provided in the white sub-pixel region W above the second substrate 320 facing the first substrate 310. The compensation pattern 360 may be patterned such as to be disposed only in the white sub-pixel region W and not in the first sub-pixel region 100 and the second sub-pixel region 200. Unlike the LCD apparatus 2 of FIG. 4, the compensation pattern 360 may be provided above (e.g., on) the second substrate 320 instead of the first substrate 310. In other words, the organic layer 350 and the compensation pattern 360 may be spaced apart from each other with the liquid crystal layer 370 provided therebetween.

A light shielding layer 340 for preventing a color mixture between the first sub-pixel region 100 and the second sub-pixel region 200 may be provided on the second substrate 320, and a third insulating layer 393 may be provided on the light shielding layer 340. The light shielding layer 340 included in the LCD apparatus 3 is provided on the second substrate 320, but is exemplary embodiments are not limited thereto. For instance, the light shielding layer 340 may be provided on the first substrate 310.

A spacer 380 for maintaining an interval between the first substrate 310 and the second substrate 320, and the compensation pattern 350 patterned to correspond to the white sub-pixel region W may be provided on the third insulating layer 393.

A method of forming the LCD apparatus 3 of FIG. 5 may include, as described above with reference to FIGS. 3A, 3B, and 3C, forming the first color filter 330a and the second color filter 330b respectively in the first sub-pixel region 100 and the second sub-pixel region 200 of the first substrate 310, and forming the organic layer 350 to cover the first color filter 330a and the second color filter 330b in the first sub-pixel region 100, the second sub-pixel region 200, and the white sub-pixel region W of the first substrate 310. The method of forming the LCD apparatus 3 of FIG. 5 may further include simultaneously forming the spacer 380 and the compensation pattern 360 using a halftone mask. An order of the forming of the first color filter 330a, the second color filter 330b, and the organic layer 350, and the forming of the spacer 380 and the compensation pattern 360 are not specifically limited to the orders described herein.

Next, the LCD apparatus 3 of FIG. 5 may be manufactured by bonding the first substrate 310 and the second substrate 320, injecting the liquid crystal layer 370 between the first and second substrates 310 and 320, and then sealing the first and second substrates 310 and 320.

According to one or more exemplary embodiments, the compensation pattern 360 and the spacer 380 may be formed of the same material as one another, and the compensation pattern 360 and the spacer 380 may be formed of a material different from the organic layer 350.

According to one or more exemplary embodiments, a height of the spacer 380 may be substantially the same as a height of the liquid crystal layer 370 in a region where the is spacer 380 is provided, and may be greater than or equal to about 3 μm. The height $h_1$ of the compensation pattern 360 may be smaller than about 1 μm. In this manner, a ratio of the height $h_1$ of the compensation pattern 360 and the height of the spacer 380 (or the height of the liquid crystal layer 370) may be more than 3. To this end, the height $h_1$ of the compensation pattern 360 may be determined by considering luminance of light emitted from the white sub-pixel region W and a change degree of a color sense within such a range.

The height $h_w$ of the liquid crystal layer 370 corresponding to the white sub-pixel region W may be smaller than the heights $h_{100}$ and $h_{200}$ of the liquid crystal layer 370 corresponding to the first sub-pixel region 100 and the second sub-pixel region 200, with respect to a direction perpendicular (or substantially perpendicular) to the first surface 310a of the first substrate 310. For instance, the height $h_w$ may be smaller based on a height difference due to the presences of the compensation pattern 360 less the step difference associated with the white sub-pixel region W not including a color filter. The heights $h_{100}$ and $h_{200}$ of the liquid crystal layer 370 may be the same or substantially the same.

According to one or more exemplary embodiments, a sum of the height $h_1$ of the compensation pattern 360 corresponding to the white sub-pixel region W and the height $h_2$ of the organic layer 350 may be greater than a sum of the height $h_3$ of the first color filter 330a and the height $h_4$ of the organic layer 350 corresponding to the first sub-pixel region 100. The heights $h_i$ through $h_4$ may be determined based on substantially flat top surfaces of the compensation pattern 360, the organic layer 350, and the first color filter 330a, and, thus, an edge region and a region curved by a stepped portion of these components may have a height different from the heights $h_1$ through $h_4$.

By disposing the compensation pattern 360 in the white sub-pixel region W, the is height $h_w$ of the liquid crystal layer 370 corresponding to the white sub-pixel region W may be smaller than the heights $h_{100}$ and $h_{200}$ of the first sub-pixel region 100 and the second sub-pixel region 200. In this manner, white light emitted through the white sub-pixel region W may be bluish. Also, the compensation pattern 360 is formed of a material having relatively high light transmissivity, but since the light transmissivity is not 100%, the compensation pattern 360 may have light absorptance. Accordingly, luminance of the white light emitted through the white sub-pixel region W may be decreased by the compensation pattern 360. A bluish white light may be mixed with yellow having relatively lower brightness to increase a color sense of yellow, and the decreased luminance of the white light may also compensate for decreased brightness of yellow in a white background. As such, by using the compensation pattern 360, a color sense of an image displayed via the LCD apparatus 3 may be the same as (or at least closer to) an intended color sense. To this end, a phenomenon in which, when a yellow image is displayed on a white background, the brightness of yellow is decreased and yellow looks ocher may be prevented (or at least reduced).

As described above, the LCD apparatuses 1 through 3 according to one or more exemplary embodiments may improve luminance and a color sense of a displayed image.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
   a first substrate comprising a first sub-pixel region, a second sub-pixel region, and a white sub-pixel region;
   a first color filter disposed on the first substrate in the first sub-pixel region;
   a second color filter disposed on the first substrate in the second sub-pixel region;
   an organic layer disposed on the first substrate, the organic layer covering the first color filter, the second color filter, and the white sub-pixel region;
   a second substrate facing the first substrate;
   a liquid crystal layer disposed between the first substrate and the second substrate; and
   a compensation pattern disposed in the white sub-pixel region between the first substrate and the second substrate,
   wherein a height of the liquid crystal layer corresponding to the white sub-pixel region is smaller than heights of the liquid crystal layer corresponding to the first sub-pixel region and the second sub-pixel region.

2. The display apparatus of claim 1, wherein the heights of the liquid crystal layer corresponding to the first sub-pixel region and the second sub-pixel region are equivalent.

3. The display apparatus of claim 1, wherein a sum of a height of a first portion of the organic layer disposed in the white sub-pixel region and a height of the compensation pattern is greater than a sum of a height of the first color filter and a height of a second portion of the organic layer disposed in the first sub-pixel region.

4. The display apparatus of claim 1, wherein:
   the first color filter is a red color filter configured to convert incident light to red light; and
   the second color filter is a green color filter configured to convert incident light to green light.

5. The display apparatus of claim 4, wherein:
   the first substrate further comprises:
      a third sub-pixel region; and
      a third color filter disposed on the first substrate in the third sub-pixel region; and
   the third color filter is a blue color filter configured to convert incident light to blue light.

6. The display apparatus of claim 5, further comprising:
   a first pixel comprising the first sub-pixel region, the second sub-pixel region, the third sub-pixel region, and the white sub-pixel region; and
   a second pixel disposed adjacent to the first pixel in a first direction, the second pixel comprising a fourth sub-pixel region configured equivalent to the first sub-pixel region, a fifth sub-pixel region configured equivalent to the second sub-pixel region, a sixth sub-pixel region configured equivalent to the third sub-pixel region, and another white sub-pixel region, wherein the first sub-pixel region, the second sub-pixel region, the third sub-pixel region, and the white sub-pixel region are arranged in a first two-by-two matrix formation, and, wherein the fourth sub-pixel region, the fifth sub-pixel region, the sixth sub-pixel region, and the another white sub-pixel region are arranged in a second two-by-two matrix formation different than the first two-by-two matrix formation.

7. The display apparatus of claim 1, further comprising:

a spacer disposed between the organic layer and the second substrate, the spacer being configured to maintain an interval between the first substrate and the second substrate, wherein the spacer and the compensation pattern comprise a same photosensitive organic material.

8. The display apparatus of claim 7, wherein a ratio of a height of the compensation pattern and a height of the spacer is greater than three.

9. The display apparatus of claim 1, wherein the organic layer and the compensation pattern comprise different materials from one another.

10. The display apparatus of claim 1, wherein:

the first substrate is arranged to receive light to display an image after the second substrate; and the compensation pattern is disposed between the organic layer and the second substrate.

11. The display apparatus of claim 1, wherein:

the first substrate is arranged to receive light to display an image before the second substrate; and the compensation pattern is disposed between the organic layer and the second substrate.

12. The display apparatus of claim 1, wherein:

the first substrate is arranged to receive light to display an image before the second substrate; and the compensation pattern is disposed between the liquid crystal layer and the second substrate.

* * * * *